No. 630,625. Patented Aug. 8, 1899.
T. J. MYERS.
METALLIC TAGGING MACHINE.
(Application filed Sept. 10, 1897.)
(No Model.) 2 Sheets—Sheet 1.
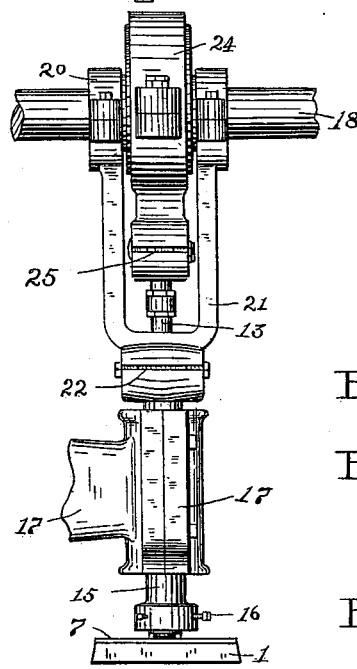
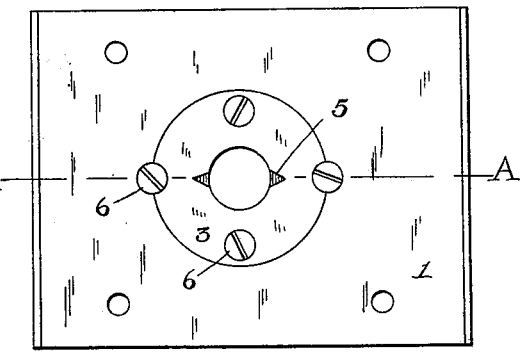
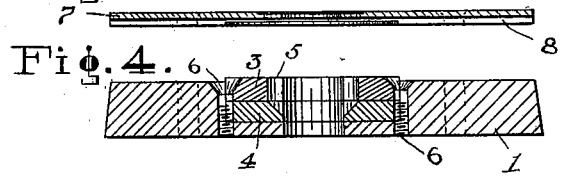
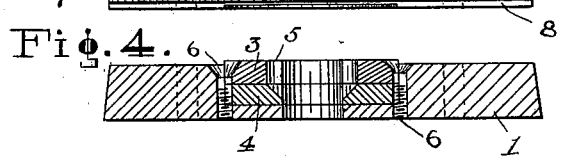
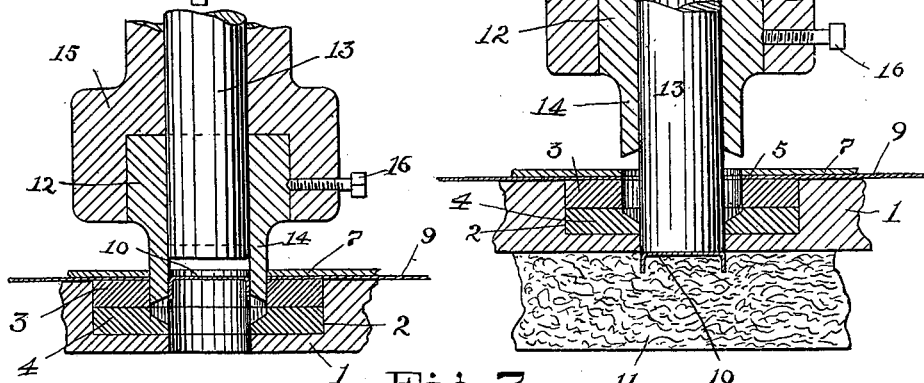
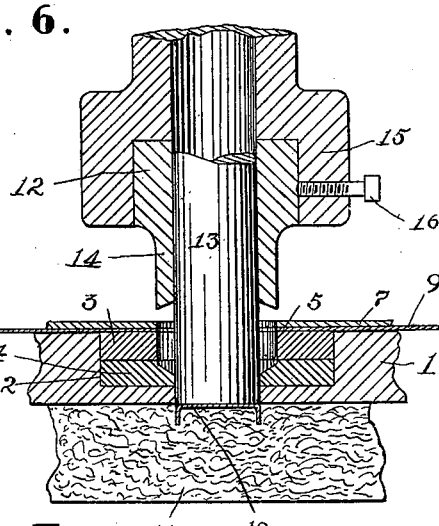
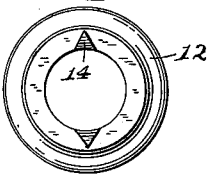
Witnesses
W. L. Bushong.
Jula Green
Inventor
Thomas J. Myers,
By V. H. Lockwood
His Attorney.

No. 630,625. Patented Aug. 8, 1899.
T. J. MYERS.
METALLIC TAGGING MACHINE.
(Application filed Sept. 10, 1897.)
(No Model.) 2 Sheets—Sheet 2.

Witnesses
W. L. Bushong
Zula Green

Inventor
Thomas J. Myers
By V. H. Lockwood
His Attorney.

UNITED STATES PATENT OFFICE.

THOMAS J. MYERS, OF INDIANAPOLIS, INDIANA.

METALLIC-TAGGING MACHINE.

SPECIFICATION forming part of Letters Patent No. 630,625, dated August 8, 1899.

Application filed September 10, 1897. Serial No. 651,252. (No model.)

*To all whom it may concern:*

Be it known that I, THOMAS J. MYERS, of Indianapolis, county of Marion, and State of Indiana, have invented a certain new and useful Metallic-Tagging Machine; and I do hereby declare that the following is a full, clear, and exact description thereof, reference being had to the accompanying drawings, in which like figures refer to like parts.

The object of my present invention is to produce a machine for making metal tags and attaching them to articles which it is desired to mark thereby, such as plugs of tobacco.

It consists in a machine for the purpose, which will be first fully described and the novel features thereof then set forth in the claims.

Figure 8:
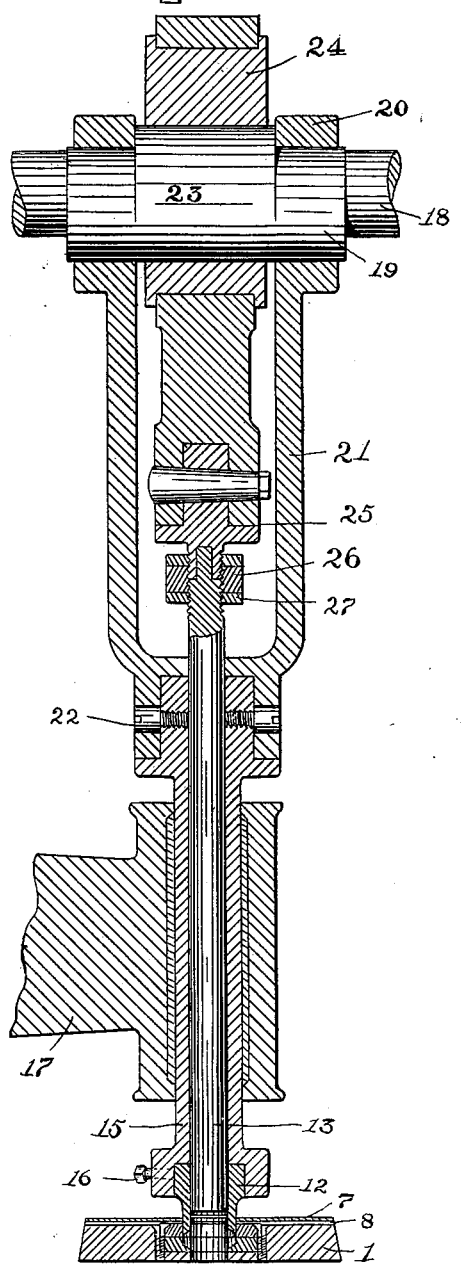
Figure 9:
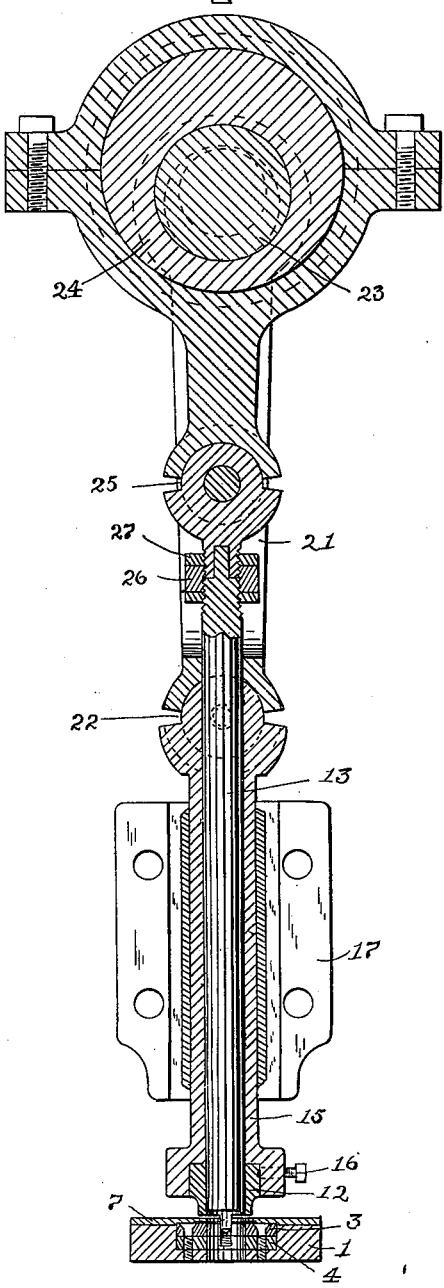

Referring to the accompanying drawings, which are made a part hereof, and on which similar reference characters indicate similar parts, Figure 1 is a side elevation of so much of a machine as is necessary to show my invention, the framework and supporting parts being detached or broken away. Fig. 2 is a top or plan view of the die separately. Fig. 3 is a central vertical sectional view of the guiding-plate which is positioned above said die; Fig. 4, a similar sectional view of the die itself on the dotted line A A in Fig. 2; Fig. 5, a central vertical sectional view of the portions shown in the lower part of Fig. 1, showing the punches in the position which they occupy when forming the prongs on the tag; Fig. 6, a similar view to Fig. 5, showing the punches in the position they occupy after the formation of the tag has been completed and the tag attached to the article. Fig. 7 is a view of the bottom end of the outer punch, showing the shape of its points that punch the prongs of the tag. Fig. 8 is a central vertical sectional view, on an enlarged scale, of the parts shown in Fig. 1; and Fig. 9 is a corresponding view taken at right angles with the point of view as shown in Fig. 8.

As above stated, the frame and supporting parts of the machine are not shown, and any appropriate form of such parts may be employed. In suitable supports I mount a driving-shaft 18, upon which are formed or secured suitable eccentrics 19 and 24, the eccentric 24 being shown as secured to a hub 23, whose diameter is sufficient to comprise that of the eccentrics 19, so as to permit the eccentric 24 to be passed over them and into place. The eccentrics 19 drive a yoke-shaped pitman 21, which is jointed, as shown at 22, and drives the outer punch by means of its stem 15. The eccentric 24 has a short arm or pitman which is jointed at 25 and drives the inner punch by its stem 13, to which said pitman is united. For the purpose of adjusting the position of the last-named punch I have shown the stem separable, the two parts having right and left hand threads which are surrounded by a correspondingly internally threaded sleeve-nut 26, which latter is secured in adjusted position by the lock-nuts 27. By this means the stroke of the punch can be regulated to suit the thickness of the article being tagged.

The sleeve-like punch-stem 15 is carried in a bearing 17, which in turn is carried by some rigid adjacent frame portion, (not shown,) and it is, as will be readily understood, guided in a fixed course by said bearing, the pitman 21 being jointed thereto, as above described. The punch-stem 13 is mounted in a longitudinal perforation extending through the stem 15 and is guided therein in a fixed course, the driving-pitman thereof being connected by a hinge-joint, as shown and above described. By the construction so shown and described I am able to secure the hereinafter-described required different movements of the two punches, notwithstanding that they are concentric to each other and reciprocate in the same lines. This difference in motion is secured by reason of the different sizes and positions of the eccentrics 19 and 24 and their opposite relative arrangement.

Upon the lower end of the hollow stem 15 is secured the outer punch 12, which is provided with two punching-points 14, by which the prongs on the tags are formed. These extend below the end of the body of this punch and operate to partially sever small triangular points from the body of the sheet of metal from which the tags are being formed and force the sharp ends downwardly, the wider ends remaining attached to the portion which afterward becomes the body of the tag. The preferred form of these points is illustrated in Figs. 5, 6, and 7, while the preferred form of the die is shown in Fig. 2, where two recesses 5, corresponding in shape to the punch-points and the prongs of the tag, are shown as cut in the sides of said die. Two prongs 14 of a triangular shape are shown; but the number and shape may of course be varied at pleasure.

The die structure is composed of a plate 1, having a cavity 2 formed in its upper side, in which the die proper is placed, said die proper being composed of two plates 3 and 4. The recesses 5 (which may be circular, as shown, or any other form desired) extend entirely through the die-plate 3 and partially through the die-plate 4, said recessed portions in said plate 4 being formed converging toward each other in order to guide the points of the prongs inwardly to proper position to be forced into the article to be tagged. These disks are secured in the main die-plate by screws 6.

Above the die I secure the guide-plate 7, so formed (by means of a recess 8, as shown in Fig. 3, or otherwise) as to leave a space through which the metallic strip 9, from which the tags are formed, may be passed while the work is being performed. This holds the strip in place and facilitates accurate work, and from said strip as it is fed along by any suitable means the tags 10 are punched.

The first operation of punching has already been described. Afterward and after the punch 12 has been retracted the punch 13 descends and cuts out the body of the tag and forces it down, driving the prongs, which have been previously formed, down through the die-plate and into the article 11 which is to be tagged, which ordinarily, in the principal use for which I have designed my machine, is a plug of tobacco, but may of course be any article to which it is desired to apply such a tag.

Having thus fully described my said invention, what I claim as new, and desire to secure by Letters Patent, is—

1. The combination, in a machine for forming metal tags, of two punches concentrically arranged, the outer hollow punch-stem being mounted in a fixed bearing, and the inner punch-stem being mounted within the outer stem, jointed pitmen attached to said two stems, the outer pitman being yoke-shaped with the joint at the lower end of the yoke, the joint for the other pitman being above and within the yoke, and a driving-shaft having eccentrics thereon by which the two punches are alternatively driven, the outer punch being shaped to form the prongs of the tag, and the inner punch formed to cut out the tag from the sheet after the prongs are formed thereon, substantially as set forth.

2. The combination, in a machine for forming metal tags, of two punches concentrically arranged and mounted to reciprocate in a stationary bearing, a pitman hinged to each of said punches whereby the same are driven, and an adjustable coupling in the stem of the inner punch composed of threaded portions fitted together, a right and left hand threaded nut uniting the two portions, and lock-nuts for holding the parts in position, substantially as shown and described.

In witness whereof I have hereunto set my hand this 25th day of August, 1897.

THOMAS J. MYERS.

Witnesses:
J. H. GEORGE,
V. H. LOCKWOOD.